United States Patent
Allen

(10) Patent No.: US 11,463,809 B1
(45) Date of Patent: Oct. 4, 2022

(54) BINAURAL WIND NOISE REDUCTION

(71) Applicant: Cirrus Logic International Semiconductor Ltd., Edinburgh (GB)

(72) Inventor: Justin L. Allen, Mesa, AZ (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/460,595

(22) Filed: Aug. 30, 2021

(51) Int. Cl.
| H04R 3/04 | (2006.01) |
| H04R 5/033 | (2006.01) |
| H04R 5/04 | (2006.01) |
| G10K 11/178 | (2006.01) |
| H04B 17/309 | (2015.01) |
| H04W 4/20 | (2018.01) |

(52) U.S. Cl.
CPC ............ *H04R 3/04* (2013.01); *H04B 17/309* (2015.01); *H04R 5/033* (2013.01); *H04R 5/04* (2013.01); *H04W 4/20* (2013.01); *G10K 11/17823* (2018.01); *G10K 2210/1081* (2013.01); *H04R 2420/07* (2013.01)

(58) Field of Classification Search
CPC . H04R 3/04; H04R 5/033; H04R 5/04; H04R 2420/07; H04R 2460/01; H04B 17/309; H04W 4/20; G10K 11/1781; G10K 11/17823; G10K 11/17835; G10K 11/17881; G10K 2210/1081; G10K 2210/12821; G10K 2210/3045; G10K 2210/3046; G10K 2210/3221
USPC .................................. 381/72, 74, 71.6, 94.7
See application file for complete search history.

(56) References Cited

U.S. PATENT DOCUMENTS

| 7,876,918 B2 * | 1/2011 | Luo ...................... H04R 25/407 29/896.21 |
| 8,861,745 B2 * | 10/2014 | Yen ........................ H04R 3/005 704/226 |
| 9,357,307 B2 * | 5/2016 | Taenzer .................... H04R 5/04 |
| 10,276,145 B2 * | 4/2019 | Zhou ................ G10K 11/17835 |
| 10,516,941 B2 * | 12/2019 | Chen ...................... H04R 3/005 |
| 11,069,365 B2 * | 7/2021 | Kar ....................... G10L 21/0272 |
| 11,074,903 B1 * | 7/2021 | Yen .................. G10K 11/17881 |
| 2004/0165736 A1 * | 8/2004 | Hetherington ...... G10L 21/0208 381/94.1 |
| 2019/0066649 A1 * | 2/2019 | Valeri .................. G10K 11/178 |

* cited by examiner

*Primary Examiner* — Xu Mei
(74) *Attorney, Agent, or Firm* — Jackson Walker L.L.P.

(57) ABSTRACT

A wind noise suppression system may include a local wind noise suppression block, a receiver, and a wind noise suppression fusion block. The local wind noise suppression block may be configured to analyze an audio signal and generate, based on the audio signal, local wind noise information associated with a first device comprising the wind noise suppression system, wherein the local wind noise information includes parameters for suppressing local wind noise at the first device. The receiver may be configured to receive remote wind noise information associated with a second device, wherein the remote wind noise information includes parameters for suppressing remote wind noise at the second device. The wind noise suppression fusion block may be configured to combine the local wind noise information and the remote wind noise information into fused wind noise information and apply parameters of the fused wind noise information to modify audio information for playback to an audio transducer of the first device.

24 Claims, 3 Drawing Sheets

BINAURAL WIND NOISE REDUCTION

TECHNICAL FIELD

The field of representative embodiments of this disclosure relates to methods, apparatuses, and implementations concerning or relating to voice applications in an audio device. Applications may include detection and reduction of wind noise using at least two microphones of an audio device.

BACKGROUND

In audio devices, including mobile devices such as hearing aids, cochlear implants, mobile telephones, headphones, and earbuds, it may be desirable to detect the presence or intensity of wind in real time. However, current wind detection techniques have many disadvantages.

In systems in which a listener uses two earbuds, each earbud may execute its own wind noise control algorithm. However, each earbud may experience different levels and directions of wind noise. It has been found that if each earbud acts independently upon the noise received at its respective ear, the user experience may be undesirable, on account of psychoacoustic effects between the user's ears.

SUMMARY

In accordance with the teachings of the present disclosure, one or more disadvantages and problems associated with existing approaches to wind noise reduction in audio devices may be reduced or eliminated.

In accordance with embodiments of the present disclosure, a wind noise suppression system may include a local wind noise suppression block, a receiver, and a wind noise suppression fusion block. The local wind noise suppression block may be configured to analyze an audio signal and generate, based on the audio signal, local wind noise information associated with a first device comprising the wind noise suppression system, wherein the local wind noise information includes parameters for suppressing local wind noise at the first device. The receiver may be configured to receive remote wind noise information associated with a second device, wherein the remote wind noise information includes parameters for suppressing remote wind noise at the second device. The wind noise suppression fusion block may be configured to combine the local wind noise information and the remote wind noise information into fused wind noise information and apply parameters of the fused wind noise information to modify audio information for playback to an audio transducer of the first device.

In accordance with these and other embodiments of the present disclosure, a method may include analyzing an audio signal, generating, based on the audio signal, local wind noise information associated with a first device comprising a wind noise suppression system, wherein the local wind noise information includes parameters for suppressing local wind noise at the first device, receiving remote wind noise information associated with a second device, wherein the remote wind noise information includes parameters for suppressing remote wind noise at the second device, combining the local wind noise information and the remote wind noise information into fused wind noise information, and applying parameters of the fused wind noise information to modify audio information for playback to an audio transducer of the first device.

In accordance with these and other embodiments of the present disclosure, a device may comprise an audio transducer and a wind noise suppression system. The wind noise suppression system may include a local wind noise suppression block, a receiver, and a wind noise suppression fusion block. The local wind noise suppression block may be configured to analyze an audio signal and generate, based on the audio signal, local wind noise information associated with the device, wherein the local wind noise information includes parameters for suppressing local wind noise at the device. The receiver may be configured to receive remote wind noise information associated with a second device, wherein the remote wind noise information includes parameters for suppressing remote wind noise at the second device. The wind noise suppression fusion block may be configured to combine the local wind noise information and the remote wind noise information into fused wind noise information and apply parameters of the fused wind noise information to modify audio information for playback to the audio transducer.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

Figure 1:
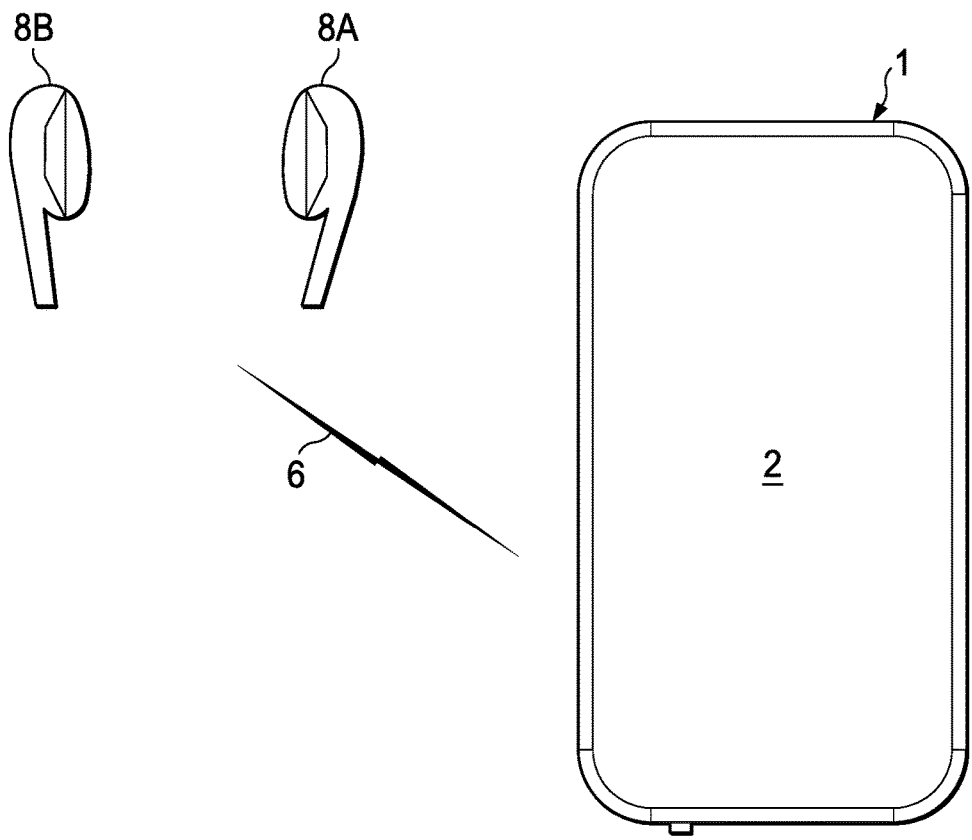
FIG. 1 is an illustration of an example portable audio device with earbuds coupled thereto, in accordance with embodiments of the present disclosure.

FIG. 1 illustrates an example portable electronic device 1, in accordance with embodiments of the present disclosure. FIG. 1 depicts portable electronic device 1 coupled to earbud speakers 8A and 8B via wireless transmissions 6 (e.g., BLUETOOTH). Earbud speakers 8A and 8B depicted in FIG. 1 are merely an example, and it is understood that portable electronic device 1 may be used in connection with a variety of audio transducers, including without limitation, headphones, earbuds, in-ear earphones, and external speakers, wherein such audio transducers may be coupled to portable electronic device 1 via wireless transmissions or wired transmissions. Portable electronic device 1 may provide a display to a user and receive user input using a touch screen 2, or alternatively, a standard liquid crystal display (LCD) may be combined with various buttons, sliders, and/or dials disposed on the face and/or sides of portable electronic device 1.

Figure 2:
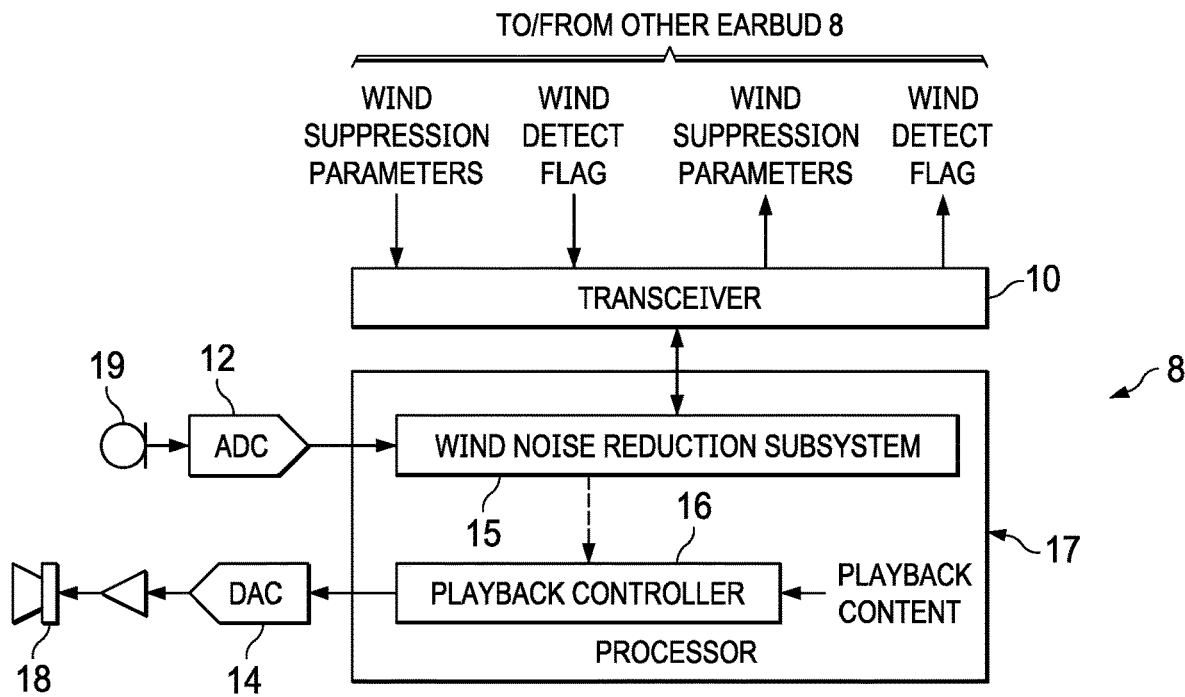
FIG. 2 illustrates a functional block diagram of an example earbud, in accordance with embodiments of the present disclosure.

FIG. 2 illustrates a functional block diagram of an example earbud 8, in accordance with embodiments of the present disclosure. Earbud 8 may comprise any suitable system, device, or apparatus for receiving audio signals (e.g., via a microphone), playing back audio signals (e.g., via a loudspeaker), and/or processing audio signals. For example, earbud 8 may comprise a hearing aid, a cochlear implant, a headphone, an earbud, and/or a combination thereof. As shown in FIG. 2, earbud 8 may include a microphone 19, an analog-to-digital converter (ADC) 12, a processor 17, a digital-to-analog converter (DAC) 14, an output audio transducer 18 (e.g., a loudspeaker), and a transceiver 10.

Microphone 19 may include any suitable input audio transducer, including without limitation, an electret microphone, condenser microphone, capacitive microphone, microelectromechanical systems (MEMS) microphone, or any other suitable microphone. In operation, microphone 19 may sense sound and generate an analog electronic signal representative of such sound. In some embodiments, microphone 19 may be positioned on an exterior of earbud 8, thus enabling microphone 19 to sense ambient sound proximate to earbud 8, including ambient noise such as wind noise. In these and other embodiments, microphone 19 may include a reference microphone used in conjunction with an active noise cancellation system.

ADC 12 may comprise any suitable system, device, or apparatus configured to convert the analog signal generated by microphone 19 into an equivalent digital input audio signal.

Processor 17 may include a microprocessor, digital signal processor, application-specific integrated circuit, field-programmable gate array, complex logic device, electrically-erasable programmable read-only memory, or other suitable processing device. Signal processing functionality of processor 17 may include a wind noise reduction subsystem 15 and playback controller 16.

Wind noise reduction subsystem 15 may receive the digital input audio signal generated by ADC 12 and may analyze the digital input audio signal, as described in greater detail below, to determine a presence and intensity of wind in the digital input audio signal. In addition, wind noise reduction subsystem 15 may also, as described in greater detail below, receive via transceiver 10 an incoming wind detect flag and incoming wind suppression parameters from another earbud 8. Further, wind noise reduction subsystem 15 may also, as described in greater detail below, transmit via transceiver 10 an outgoing wind detect flag and outgoing wind suppression parameters to the other earbud 8. Moreover, based on a presence and intensity of wind in the digital input audio signal as received by microphone 19 and based on the incoming wind detect flag and incoming wind suppression parameters, wind noise reduction subsystem 15 may generate one or more control signals (e.g., gain and/or attenuation signals) to be communicated to playback controller 16.

Playback controller 16 may apply control signals (e.g., gain and/or attenuation signals) to audio information (shown as "playback content" in FIG. 2) reproduced to output audio transducer 18. Playback content may comprise any suitable audio content for playback to output audio transducer 18, including source audio stored in an audio file or downlink speech associated with a voice call. In these or other embodiments, portable audio device 1 and earbud 8 may operate in a hearing augmentation mode or as a hearing aid, in which the playback content comprises audio information received from microphone 19 which may be modified by playback controller 16 in order to enhance the ambient sound incident on microphone 19 to aid a user's perception or understanding of such ambient sound.

DAC 14 may comprise any suitable system, device, or apparatus configured to convert the modified audio signal generated by playback controller 16 to an equivalent analog output audio signal. Such analog output audio signal may be amplified and communicated to output audio transducer 18 for playback of modified audio information.

Transceiver 10 may include any system, device, or apparatus configured to receive the outgoing wind detect flag and outgoing wind suppression parameters from wind noise reduction subsystem 15 and communicate the outgoing wind detect flag and outgoing wind suppression parameters to a corresponding transceiver of another earbud 8. Furthermore, transceiver 10 may be configured to receive the incoming wind detect flag and incoming wind suppression parameters from the corresponding transceiver of the other earbud 8 and communicate the incoming wind detect flag and incoming wind suppression parameters to wind noise reduction subsystem 15. In some embodiments, transceiver 10 may be configured to communicate with the other transceiver via wireless transmissions (e.g., BLUETOOTH). In these and other embodiments, transceiver 10 may be configured to communicate with the other transceiver via a wired connection.

Figure 3:
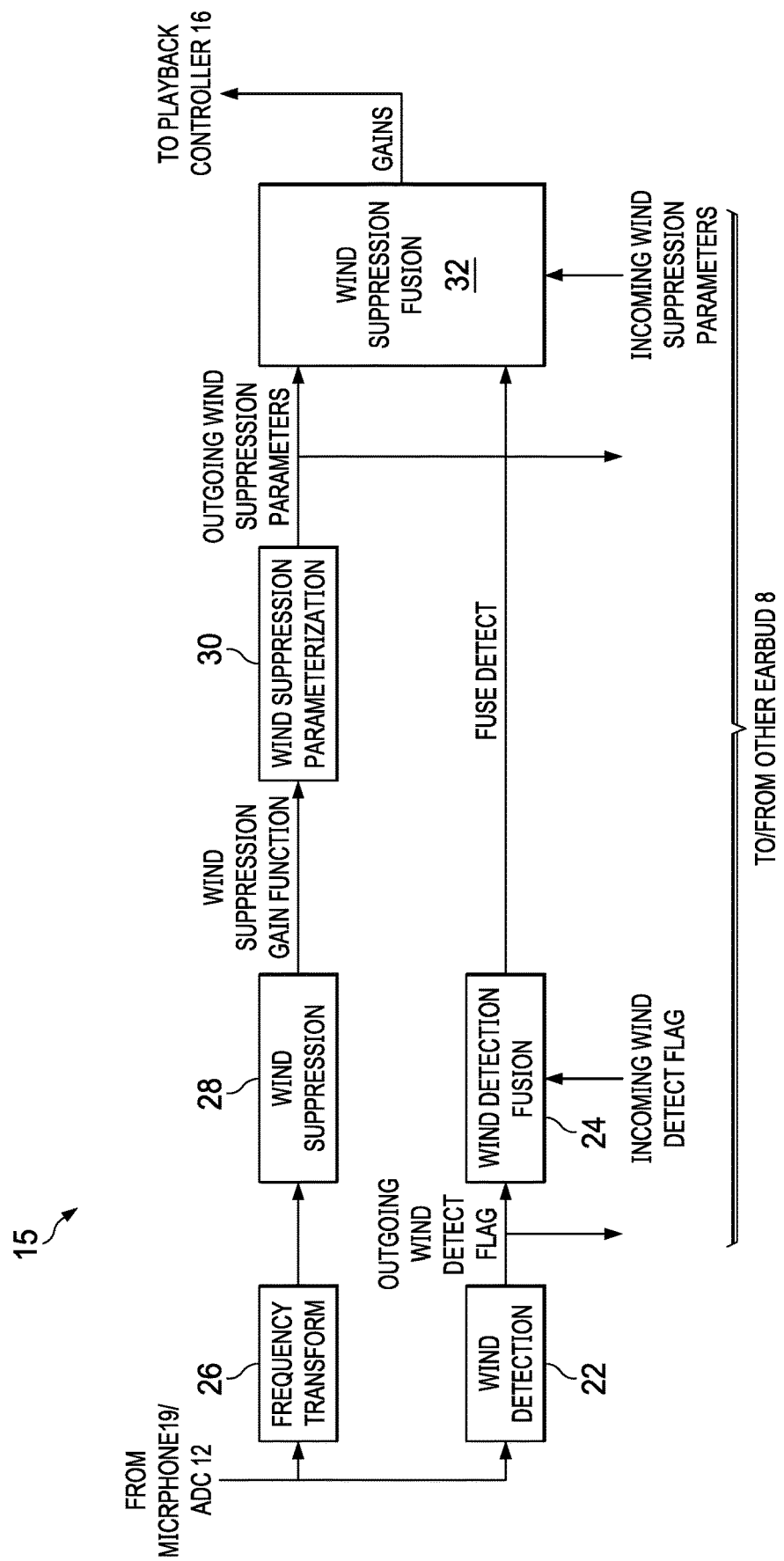
FIG. 3 illustrates a functional block diagram of an example wind noise reduction subsystem, in accordance with embodiments of the present disclosure.

FIG. 3 illustrates a functional block diagram of an example wind noise reduction subsystem 15, in accordance with embodiments of the present disclosure. As shown in FIG. 3, wind noise reduction subsystem 15 may include wind detection block 22, wind detection fusion block 24, frequency transform block 26, wind suppression block 28, wind suppression parameterization block 30, and wind suppression fusion block 32.

Wind detection block 22 may receive the digital audio input signal from ADC 12 and analyze such digital audio input signal to determine if wind noise is present in the digital audio input signal. Wind detection block 22 may use any suitable method, algorithm, or approach for determining whether wind noise is present, including without limitation the wind noise detection approach described in U.S. patent application Ser. No. 17/384,983, filed Jul. 26, 2021, and incorporated by reference herein in its entirety. Based on whether wind noise is present in the digital audio input signal, wind detection block 22 may generate the outgoing wind detect flag indicative of whether or not wind noise is present in the digital audio input signal.

Wind detection fusion block 24 may receive the outgoing wind detect flag and the incoming wind detect flag (which may be generated from an analogous wind detection block present in another earbud 8) and based thereon, generate a fusion detection signal ("FUSE DETECT") indicative of whether either or both of outgoing wind detect flag and incoming wind detect flag indicate the presence of wind noise.

Frequency transform block 26 may receive the digital audio input signal from ADC 12 and transform the time domain sample of the digital audio input signal to frequency-domain data (e.g., using a fast Fourier transform or other suitable transform.

Wind suppression block 28 may receive the transformed digital audio signal from frequency transform block 26 and based thereon, generate a wind suppression gain function for suppressing any wind noise present in the digital audio input signal. Wind suppression block 28 may use any suitable method, algorithm, or approach for generating such wind suppression gains, and generation of such gains is beyond the scope of this disclosure. In some embodiments, wind suppression gain function may define a gain/attenuation (e.g., in terms of decibels) to be applied to playback content versus frequency.

Wind suppression parameterization block 30 may comprise any system, device, or apparatus configured to generate one or more outgoing wind suppression parameters indicative of the wind suppression gain function generated by wind suppression block 28, and transmit outgoing wind suppression parameters to the other earbud. The one or more parameters may estimate the wind suppression gain function using a smaller data set than that of the wind suppression gain function itself, which may be beneficial due to the fact that there may exist limited bandwidth for communicating data between earbuds 8.

Figure 4:
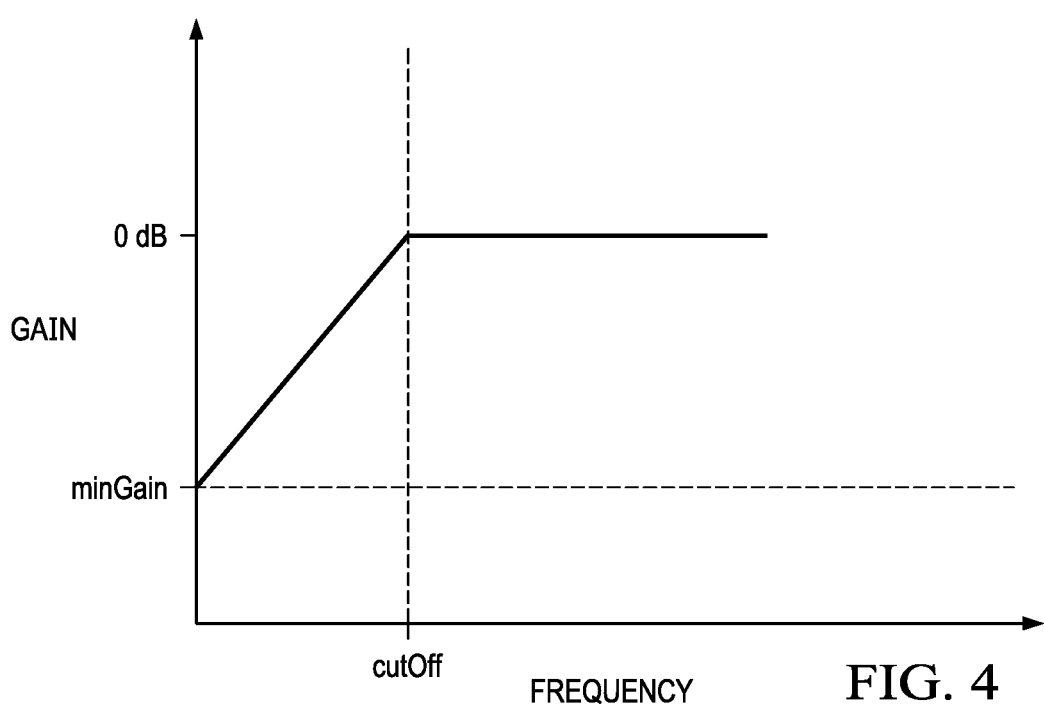
FIG. 4 illustrates a graph of gain versus frequency of a reconstructed wind noise suppression function recreated from two parameters defining a high-pass filter that approximates the wind noise suppression function, in accordance with embodiments of the present disclosure.

For example, in some embodiments, a wind suppression gain function may be approximated by a high-pass filter defined by as few as two parameters: a minimum gain and a cutoff frequency. To illustrate, the wind suppression gain function may be defined by a number (e.g., 17) of frequency bands and gains associated with each of such frequency bands. However, the wind suppression gain function may also have a profile that may be closely approximated by a high pass filter. Accordingly, a minimum gain parameter minGain may be set equal to the gain associated with the lowest-frequency band of the wind suppression gain function, and the cutoff frequency parameter cutOff may be set to a frequency representing the lowest frequency at which the wind suppression gain function approximates a unity gain (e.g., 0 decibels). When received as incoming wind noise suppression parameters by another earbud 8, such parameters minGain and cutOff may be used to create an approximation of the wind suppression gain function having a gain equal to minGain at the lowest-frequency band of the wind suppression gain function, increasing linearly (in terms of a logarithmic decibel scale) from the minGain to unity gain from the lowest-frequency band of the wind suppression gain function to the cutoff frequency represented by parameter cutOff, and then having a flat unity gain (0 decibels) from frequencies above the cutoff frequency, as shown in FIG. 4.

As another example, in some embodiments, wind suppression parameterization block 30 may maintain or otherwise have access to a table of wind suppression gain profiles. In such embodiments, wind suppression parameterization block 30 may determine which wind suppression gain profile in the table of wind suppression gain profiles best approximates the wind suppression gain function, and communicate an index of the table to such wind suppression gain profile as the outgoing wind suppression parameters. Accordingly, when the outgoing wind suppression parameters are received by the other earbud as incoming wind suppression parameters, the other earbud may approximate the wind suppression gain function of the transmitting earbud by referencing the wind suppression gain profile identified by the received table index parameters.

Wind suppression fusion block 32 may comprise any system, device, or apparatus configured to combine wind suppression gain information from two earbuds (e.g., the local earbud in which wind suppression fusion block 32 is present and another earbud from which wind suppression fusion block 32 receives wind suppression gain information) and combine the information from the two earbuds to generate one or more gains in order to optimize user experience. Thus, as shown in FIG. 3, wind suppression fusion block 32 may receive incoming wind suppression parameters communicated from another earbud and outgoing wind suppression parameters generated by wind suppression parameterization block 30. However, in some embodiments, in lieu of locally-generated and outgoing wind suppression parameters, wind suppression fusion block 32 may use the wind suppression gain function generated by wind suppression block 28.

Wind suppression fusion block 32 may apply any suitable optimization to generate gains communicated to playback controller 16. For example, in some embodiments, the wind suppression fusion block 32 of both earbuds 8A and 8B may operate to increase the suppression of the earbud with the most suppression (e.g., lowest gains) present in its respective wind suppression gain function in order to place psychoacoustic emphasis on the earbud having the least suppression in its respective wind suppression gain function. This approach to wind suppression fusion may take advantage of psychoacoustic principles of sound masking and binaural loudness. Sound masking is the practice of intentionally injecting noise in an environment to mask other unwanted sounds or increase privacy. Thus, by further suppressing the earbud 8 having more wind noise, the ear with less noise may experience less masking and may be perceived as more intelligible. Binaural loudness is a phenomenon whereby a sound may be perceived to spatially shift toward the ear receiving the loudest sound. Thus, by further suppressing the earbud with more wind noise, the sound may be perceived as spatially shifting towards the earbud with less wind noise.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A wind noise suppression system, comprising:
   a local wind noise suppression block configured to:
      analyze an audio signal; and
      generate, based on the audio signal, local wind noise information associated with a first device comprising the wind noise suppression system, wherein the local wind noise information includes parameters for suppressing local wind noise at the first device;
   a receiver configured to receive remote wind noise information associated with a second device, wherein the remote wind noise information includes parameters for suppressing remote wind noise at the second device; and
   a wind noise suppression fusion block configured to:
      combine the local wind noise information and the remote wind noise information into fused wind noise information; and
      apply parameters of the fused wind noise information to modify audio information for playback to an audio transducer of the first device.

2. The wind noise suppression system of claim 1, wherein the wind noise suppression fusion block is further configured to increase suppression of the local wind noise when a level of the local wind noise is greater than a level of the remote wind noise.

3. The wind noise suppression system of claim 1, wherein each of the first device and the second device comprise an earbud.

4. The wind noise suppression system of claim 1, wherein the receiver receives the remote wind noise information via wireless communication with the second device.

5. The wind noise suppression system of claim 1, wherein the local wind noise suppression block is further configured to transmit local noise parameters representative of the local wind noise information to the second device.

6. The wind noise suppression system of claim 5, wherein the local noise parameters include parameters for approximating the local wind noise information to a filter, the local noise parameters having characteristics to allow the second device to approximate the local wind noise information at the second device.

7. The wind noise suppression system of claim 6, wherein the filter is a high-pass filter.

8. The wind noise suppression system of claim 5, wherein the local wind noise suppression block is further configured to:
   select a pre-defined profile approximating the local wind noise information from a plurality of pre-defined profiles; and
   transmit an indication of the pre-defined profile to enable the second device to choose a corresponding pre-defined profile at the second device to approximate the local wind noise information at the second device.

9. A method, comprising:
   analyzing an audio signal;
   generating, based on the audio signal, local wind noise information associated with a first device comprising a wind noise suppression system, wherein the local wind noise information includes parameters for suppressing local wind noise at the first device;
   receiving remote wind noise information associated with a second device, wherein the remote wind noise information includes parameters for suppressing remote wind noise at the second device;
   combining the local wind noise information and the remote wind noise information into fused wind noise information; and
   applying parameters of the fused wind noise information to modify audio information for playback to an audio transducer of the first device.

10. The method of claim 9, further comprising increasing suppression of the local wind noise when a level of the local wind noise is greater than a level of the remote wind noise.

11. The method of claim 9, wherein each of the first device and the second device comprise an earbud.

12. The method of claim 9, wherein receiving the remote wind noise information comprises receiving the remote wind noise information via wireless communication with the second device.

13. The method of claim 9, further comprising transmitting local noise parameters representative of the local wind noise information to the second device.

14. The method of claim 13, wherein the local noise parameters include parameters for approximating the local wind noise information to a filter, the local noise parameters having characteristics to allow the second device to approximate the local wind noise information at the second device.

15. The method of claim 14, wherein the filter is a high-pass filter.

16. The method of claim 13, further comprising:
   selecting a pre-defined profile approximating the local wind noise information from a plurality of pre-defined profiles; and
   transmitting an indication of the pre-defined profile to enable the second device to choose a corresponding pre-defined profile at the second device to approximate the local wind noise information at the second device.

17. A device comprising:
   an audio transducer; and
   a wind noise suppression system comprising:
      a local wind noise suppression block configured to:
         analyze an audio signal; and
         generate, based on the audio signal, local wind noise information associated with the device, wherein the local wind noise information includes parameters for suppressing local wind noise at the device;

a receiver configured to receive remote wind noise information associated with a second device, wherein the remote wind noise information includes parameters for suppressing remote wind noise at the second device; and a wind noise suppression fusion block configured to:
combine the local wind noise information and the remote wind noise information into fused wind noise information; and
apply parameters of the fused wind noise information to modify audio information for playback to the audio transducer.

18. The device of claim 17, wherein the wind noise suppression fusion block is further configured to increase suppression of the local wind noise when a level of the local wind noise is greater than a level of the remote wind noise.

19. The device of claim 17, wherein each of the device and the second device comprise an earbud.

20. The device of claim 17, wherein the receiver receives the remote wind noise information via wireless communication with the second device.

21. The device of claim 17, wherein the local wind noise suppression block is further configured to transmit local noise parameters representative of the local wind noise information to the second device.

22. The device of claim 21, wherein the local noise parameters include parameters for approximating the local wind noise information to a filter, the local noise parameters having characteristics to allow the second device to approximate the local wind noise information at the second device.

23. The device of claim 22, wherein the filter is a high-pass filter.

24. The device of claim 21, wherein the local wind noise suppression block is further configured to:
select a pre-defined profile approximating the local wind noise information from a plurality of pre-defined profiles; and
transmit an indication of the pre-defined profile to enable the second device to choose a corresponding pre-defined profile at the second device to approximate the local wind noise information at the second device.

* * * * *